(12) United States Patent
Smith

(10) Patent No.: US 11,530,929 B1
(45) Date of Patent: Dec. 20, 2022

(54) NAVIGATIONAL SYSTEM FOR MEETING REAL-TIME USER NEEDS

(71) Applicant: UIPCO, LLC, San Antonio, TX (US)

(72) Inventor: Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 536 days.

(21) Appl. No.: 16/596,326

(22) Filed: Oct. 8, 2019

Related U.S. Application Data

(60) Provisional application No. 62/751,283, filed on Oct. 26, 2018.

(51) Int. Cl.
   *G01C 21/34* (2006.01)
   *G06Q 10/02* (2012.01)

(52) U.S. Cl.
   CPC ....... *G01C 21/3476* (2013.01); *G01C 21/343* (2013.01); *G06Q 10/02* (2013.01)

(58) Field of Classification Search
   CPC ... G01C 21/3476; G01C 21/343; G06Q 10/02
   See application file for complete search history.

(56) References Cited

U.S. PATENT DOCUMENTS

| | | | | |
|---|---|---|---|---|
| 2009/0030603 | A1* | 1/2009 | Madalin, Jr. | G01C 21/3697 701/533 |
| 2011/0136463 | A1* | 6/2011 | Ebdon | G08B 7/066 455/404.1 |
| 2016/0371966 | A1* | 12/2016 | P | G01C 21/3415 |
| 2018/0228448 | A1* | 8/2018 | Miyazawa | H04M 11/00 |
| 2019/0170537 | A1* | 6/2019 | Gibson | H04W 4/024 |

* cited by examiner

*Primary Examiner* — Peter D Nolan
*Assistant Examiner* — Tarek Elarabi
(74) *Attorney, Agent, or Firm* — Plumsea Law Group, LLC

(57) ABSTRACT

The present disclosure relates to navigational systems, devices, and methods for preparing route guidance information that incorporates user needs—and ensures fulfilment of those needs under a variety of conditions. In particular, this disclosure relates to preparing route guidance information that ensures a user is directed along a route that includes stops where various needs such as e.g. medical, food, or water can be met while also minimizing traffic. Such a system may be useful, for example, when evacuating from a metro region in the face of an oncoming natural disaster such as a hurricane.

15 Claims, 10 Drawing Sheets

NAVIGATIONAL SYSTEM FOR MEETING REAL-TIME USER NEEDS

CROSS-REFERENCE TO RELATED APPLICATIONS

This application claims the benefit of Provisional Patent Application No. 62/751,283 filed Oct. 26, 2018 and titled "Navigational System for Meeting Real-Time User Needs," which is incorporated by reference herein in its entirety.

TECHNICAL FIELD

The present disclosure relates to navigational systems, devices, and methods for preparing route guidance information that incorporates user needs. Generally, this disclosure relates to the field of hardware computer systems and mobile computing devices that calculate GPS route navigation in response to user inputs.

BACKGROUND

Many well-known digital route guidance systems have been in common use for years. Most commonly used for street directions when driving, route guidance systems generally provide turn-by-turn directions between two geographic locations. The Global Positioning System ("GPS") is a satellite based network system that provides geolocation and time information to a GPS receiver, and most route guidance systems are based on combining GPS data with map information.

In recent years, route guidance systems have most commonly been used on mobile computing devices such as smart phones. A variety of mobile computing device based route guidance systems are known in the art. Systems such as Google Maps, Apple Maps, Waze, and other third-party smartphone apps are used by millions of smartphone owners each day. These systems generally include different graphical user interfaces, slightly different underlying map data, and may also draw on other various types of information when calculating route information. For example, Waze is known in the art for its peer-to-peer traffic data.

However, existing route guidance systems do not currently incorporate all of the many types of data that might help in selecting the best particular route to address a user's preferences and needs.

There is a need in the art for systems, devices, and methods that addresses the shortcomings of the prior art discussed above.

SUMMARY OF THE DISCLOSURE

In one aspect, the disclosure provides a system for preparing and sending route guidance information comprising: a server computer including a processor; the server computer being in communication with at least one database; and the server also being in communication with at least one mobile computing device; wherein the server computer is configured to perform the steps of: receiving traffic information from a traffic database; receiving location information from the mobile computing device; receiving personal consumption needs information from the mobile computing device, the personal consumption needs information being inputted into the mobile computing device by a user; retrieving information from the at least one database, wherein the at least one database includes information related to a location and availability of a consumable resource; calculating fulfilment information, the fulfilment information being information regarding whether and where a personal consumption need of the user matches the location and availability of the consumable resource, by comparing the information related to the consumable resource from the database with the location information and the personal consumption needs information received from the mobile computing device; preparing route guidance information, from a first geographic location specified in the location information received from the mobile computing device to a second geographic location, the route guidance information being calculated based on both the traffic information and the fulfilment information; and sending the route guidance information and fulfilment information to the mobile computing device.

In another aspect, the disclosure provides a method of operating a navigation system including a computer system in communication with at least one mobile computing device, the computer system being configured to perform the steps of: (1) receiving traffic information from a traffic database; (2) receiving location information from the mobile computing device; (3) receiving a set of personal consumption needs information from the mobile computing device, the set of personal consumption needs information being generated by a user of the mobile computing device and being descriptive of the user's need for two or more types of consumable resources; (4) retrieving supply information from at least one database, the supply information being descriptive of a location and amount available of each of two or more types of consumable resources; (5) calculating present fulfilment information by comparing the set of personal consumption needs information to the supply information; (6) calculating future fulfilment information by comparing the present fulfilment information with the traffic information to determine a draw-down rate over time at which one or more of types of consumable resources may be used up, so as to predict availability of the consumable resources at a future time; (7) preparing route guidance information based on the traffic information, the present fulfilment information, and the future fulfilment information; and (8) sending the route guidance information, and future fulfilment information, to the mobile computing device.

In another aspect, the disclosure provides a mobile computing device configured to: (a) receive initiating event information, the initiating event information including geographic data regarding a danger region and a safety region; (b) generate location data based on a location of the mobile computing device; (c) receive traffic information from a traffic database; (d) receive inputs from a user of the mobile computing device relating to personal consumption needs information of the user; (e) retrieve information from the at least one database, wherein the at least one database includes information related to a location and availability of a consumable resource; (f) calculate whether the mobile computing device is located within the danger region by comparing the initiating event information with the location data; (g) calculate fulfilment information, the fulfilment information being information regarding whether and where a personal consumption need of the user matches the location and availability of the consumable resource, by comparing the information related to the consumable resource from the database with the location data and the personal consumption needs information; (h) prepare route guidance information, from a first geographic location within the danger region to a second geographic location within the safety region, the route guidance information being calculated based on both the traffic information and the fulfilment information; and (i) display the route guidance information and fulfilment information on the mobile computing device.

In another aspect, this disclosure provides a non-transitory computer readable storage medium including instructions which, when executed by one or more computing devices, carry out a method for preparing and sending route guidance information; the method comprising: (1) receiving traffic information from a traffic database; (2) receiving location information from a mobile computing device; (3) receiving personal consumption needs information from the mobile computing device; (4) retrieving information from the at least one database, wherein the at least one database includes information related to a location and availability of a consumable resource; (5) calculating fulfilment information, the fulfilment information being information regarding whether and where a personal consumption need matches the location and availability of the consumable resource, by comparing the information related to the consumable resource from the database with the location information and the personal consumption needs information received from the mobile computing device; (6) preparing route guidance information, from a first geographic location specified in the location information received from the mobile computing device to a second geographic location, the route guidance information being calculated based on both the traffic information and the fulfilment information; wherein the route guidance information is prepared by performing an optimization calculation across all possible routes between the first geographic location and the second geographic location, the optimization calculation seeking to both: minimize travel time from the first geographic location to the second geographic location based on the traffic information, and fulfil the personal consumption needs of the user based on the fulfilment information; and (8) sending the route guidance information and fulfilment information to the mobile computing device.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
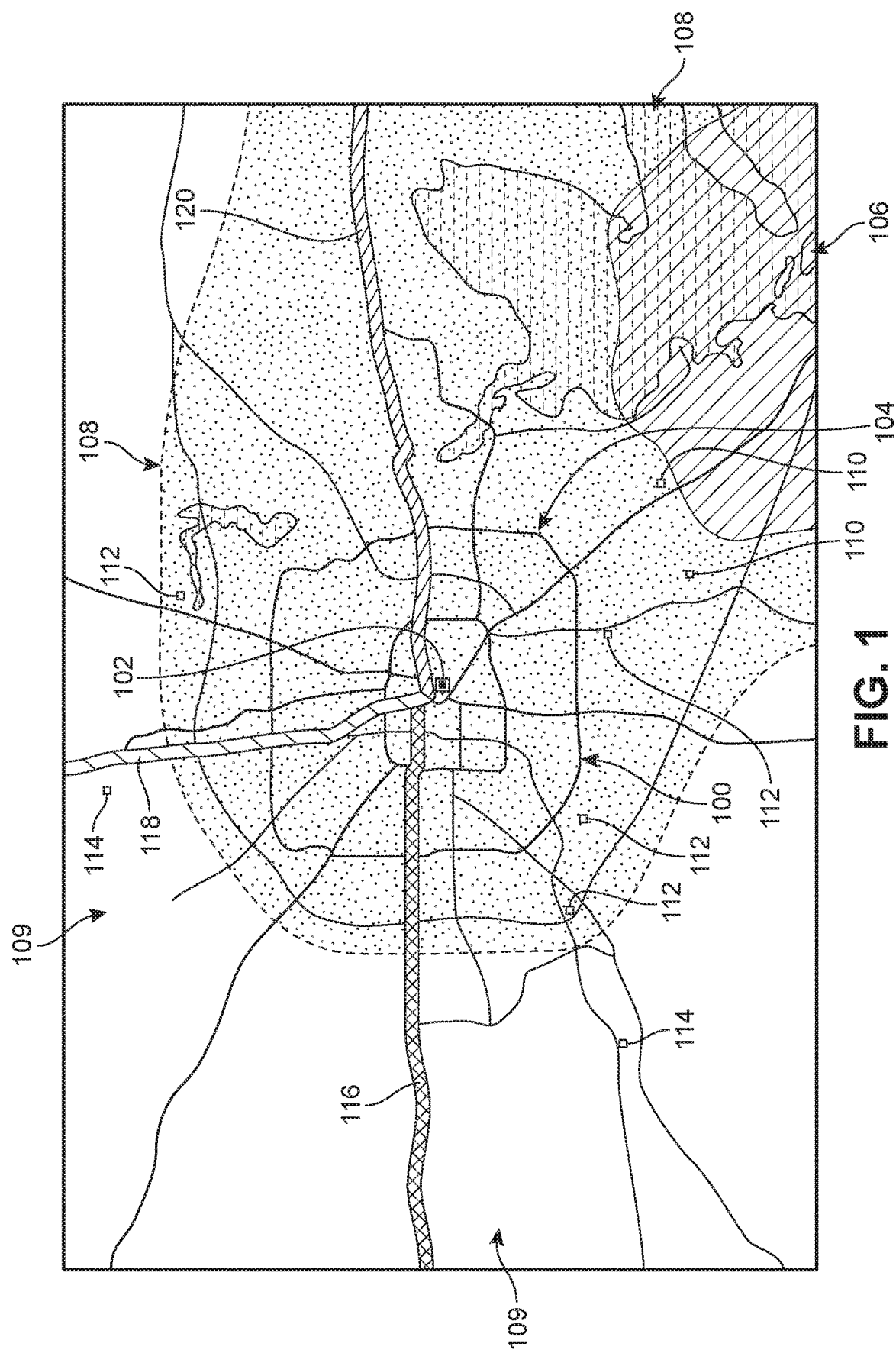
FIG. 1 is a map showing a graphical representation of a set of route guidance information, created in accordance with this disclosure in response to an oncoming natural disaster event such as a hurricane.

Navigation systems that calculate route guidance information are broadly disclosed that incorporate user needs in order to optimize the route. Generally, existing navigation systems calculate a driving route between two destinations by accepting inputs of a beginning destination and an ending destination. In this disclosure, navigation systems further accept inputs relating to one or more user consumption needs. The navigation system then receives information from one or more databases relating to consumable resources, and matches the location and availability of the resources to the user needs while calculating a route.

A person using a navigation system may desire different types of route guidance information from the system, depending on factors such as their circumstances and location. Most broadly, this disclosure provides a system, method, mobile computing device, and non-transitory computer readable storage medium that prepare route guidance information. The route guidance information is calculated based on meeting a user's personal consumption needs by preparing a route that includes locations with resources that meet the personal consumption needs. The navigation system is therefore useful in circumstances when a user has one or more unmet personal consumption needs, when the user may otherwise be unsure of the best route to take that would include stops that fulfil these needs.

Under normal circumstances, a user of a route navigation system who is travelling may simply stop at any gas station or convenience store in order to meet personal consumption needs such as food, water, and fuel. Known navigation systems therefore do not commonly incorporate additional data regarding the availability of things like gas, food, or water—but instead merely take for granted that, if a gas station or convenience store is located nearby on a map, directing the user to the known location will be sufficient to meet the user's needs.

In contrast, navigation systems in accordance with this disclosure broadly include data regarding the actual availability of a resource such as gas, food, or water. The route guidance information prepared by the system therefore incorporates directions along a route that allows the traveler to stop at the locations having availability of the resource. By allowing a user to input their needs for consumable resources, the present system calculates the best possible route guidance information based on those needs—as well as other factors. Other factors may include travel time, traffic flow, road closures, and others. In particular, by optimizing route guidance information based on both traffic information as well as the user's needs in relation to a consumable resource, the presently disclosed navigation system may ensure that the route guidance information allows a traveler to best avoid traffic while also meeting their personal needs.

This type of system may be useful in a wide variety of situations, but in particular the presently disclosed navigation systems may be useful when consumable resources are scarce. For example, natural disasters such as hurricanes frequently cause resources shortages, evacuations, and displacement of large numbers people. Communities are frequently hard hit by such natural disasters, and emergency preparedness is increasingly being recognized as an important economic and social policy. These types of scenarios often result in not only the direct damage and economic loss from the natural disaster itself, but also cause indirect problems when evacuations go awry and needed supplies are not available in a timely manner. The present navigation system may, in some embodiments, help a user to prepare the best available evacuation route by presenting route guidance information that is relevant to these circumstances.

For example, in one embodiment, FIG. 1 shows a graphical set of route guidance information in the face of one particular type of circumstances: an approaching hurricane 106. The embodiment shown in FIG. 1 is just one type of circumstances out of many in which a route guidance system in accordance with this disclosure may be used. This particular set of circumstances, and the related embodiments, will be discussed in detail as non-limiting examples of route guidance information generated by a system in accordance with this disclosure.

In particular, a user located in a city's metro region 100 may seek to evacuate from that metro region 100 in response to a natural disaster such as a hurricane 106—and may desire route guidance information in order to do so. A user may be located at location 102 within metro region 100. Metro region 100 may include numerous local roads 104.

As a result of oncoming hurricane 106, a government entity or other organization may declare an evacuation zone 108. Evacuation zone 108 encompasses metro region 100, and outlying towns 110 that are directly in the path of hurricane 106. The evacuation zone 108 also includes outlying towns 112 that, while not directly in the path of hurricane 106, still need to be evacuated. Safety region 109 includes any geographic area not within evacuation zone 108, such as outlying towns 114.

Under these circumstances, a user located at 102 may have three options for evacuation. A western route 116, an eastern route 120, and a northern route 118. Each of these three routes may have different reasons for and against using it as an evacuation route away from metro region 100. A conventional navigation system may not accurately account for these various reasons, and may therefore provide the user with route guidance information that could be less than optimal—and perhaps even disastrous.

Specifically, for example, many people within metro region 100 may seek route guidance information by inputting a commonly known nearby destination into their navigation system. Under normal circumstances, specifying only a desired destination location may be perfectly fine—because we take for granted that any given route will not be extremely overly congested with traffic most of the time, and that supplies (like gas and food) will be readily available at gas stations along the route. However, in an emergency situation like as is shown in FIG. 1, neither of these assumptions may be true. Instead, one of the routes 116 may be extremely congested with traffic such that cars are at a standstill—and also no gas or food are available. This may occur because a great many people within metro region 100 all chose to input into their conventional navigation system the same (or similar) destination location, and therefore followed the same route guidance information. As a result, the road capacity is overwhelmed along this route and all available resources are depleted. People are therefore stranded without food or water, creating a secondary disaster in the wake of the hurricane.

However, a navigation system in accordance with this disclosure is configured to automatically evaluate additional considerations so as to avoid this secondary disaster. Specifically, the present navigation system may receive additional data from the user regarding the user's need for personal consumption items like gas or food. Typically, this may occur by prompting the user to enter information into the user's mobile computing device. Furthermore, the navigation system in accordance with this disclosure may also evaluate and present several destination locations—and is not necessarily limited to receiving a destination location inputted by the user. Namely, in an emergency like a hurricane, the user may be better off if the navigation system directs them to any location in safety region 109 rather than prompting the user to decide where to go. As a result, the navigation system may evaluate western route 116 as a non-viable route due to traffic and lack of supplies, present eastern route 120 as a non-viable route due to failure to reach safety region 109 in a reasonable time, and present northern route 118 as a viable route that successfully matches the user's needs.

Further details regarding embodiments of the hardware used, the information received, and the calculations performed, to achieve these results are discussed as follows with respect to the additional figures.

Figure 2:
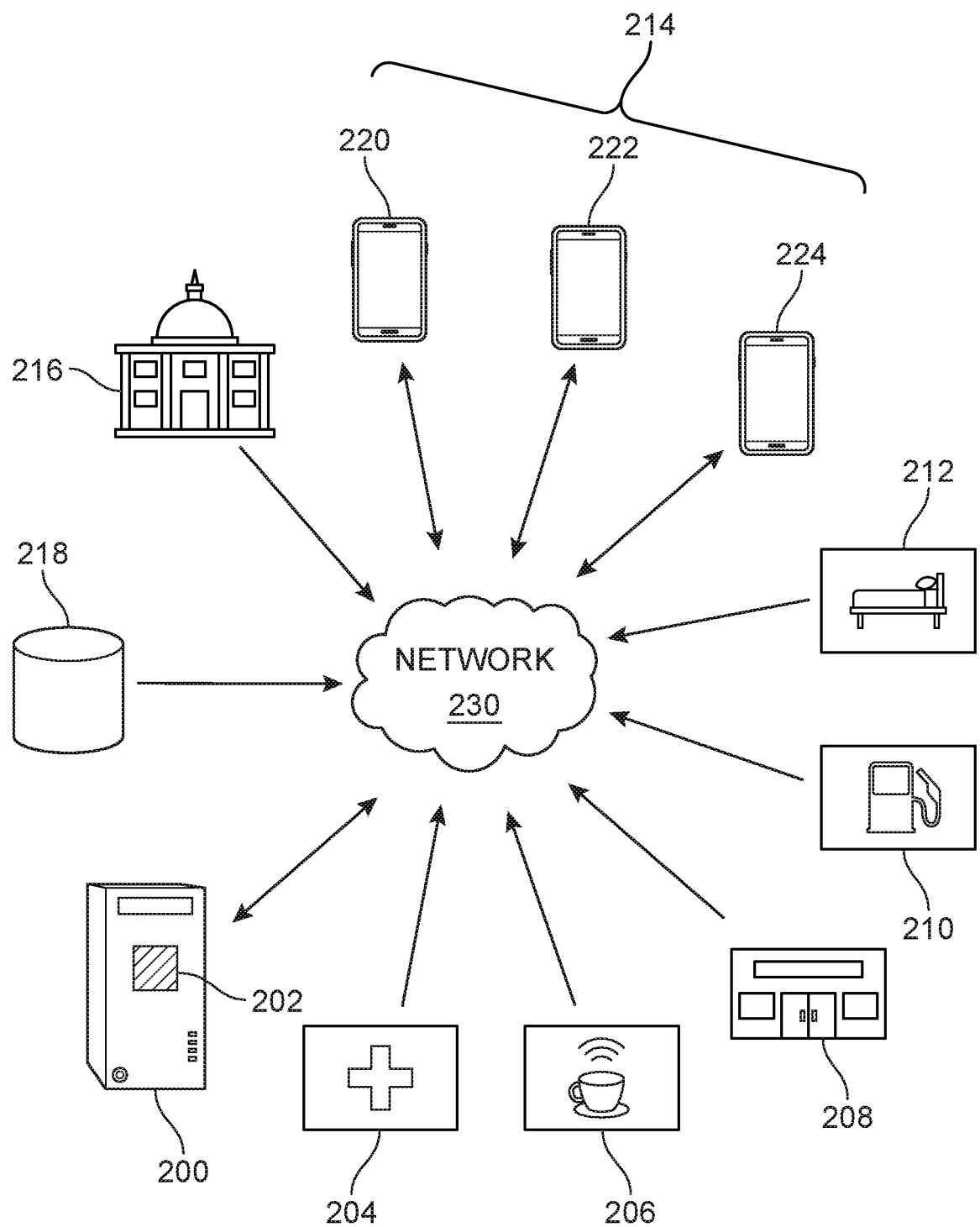
FIG. 2 is a diagram showing a representation of a network of multiple sources of information and related hardware in accordance with this disclosure.

FIG. 2 is a diagram showing that various components that work in communication with each other as part of the system for preparing route guidance information. In this embodiment, server 200 is in communication with network 230. Server 200 is, for the purposes of this disclosure, a special purpose computer that includes central processing unit 202 as well as input/output devices that are in communication with network 230. Server 200 generally may also include known computer components such as a non-transitory computer readable storage medium (i.e. a hard drive), transitory computer readable storage medium (i.e. memory, or RAM), and other components as may be necessary.

Network 230 may generally be any system of one or more computers or devices that include sufficient communication hardware and software so as to exchange the information discussed herein. Aspects of network 230 may include such well-known systems as any of the multitude of internet protocols, various wireless communication methods such as 3G or LTE, or other network systems, and naturally includes the vast amount of hardware and software that makes these systems function.

One or more mobile computing device 214 are also in communication with network 230. Mobile computing devices 214 are generally any electronic device that are portable in size, capable of communicating wirelessly with network 230, and capable of performing generalized computing functions. For purposes of this disclosure mobile computer devices 214 are configured to receive input from a user, and then communicate these inputs via network 230 to server 200. In some embodiments, the navigation system may be in communication with multiple mobile computing devices 220, 222, and 224. As discussed herein below, the navigation system may deliver similar route guidance information to each of the multiple mobile computing devices 220, 222, and 224 or entirely different route guidance information.

Network 230 is also in communication with other sources of electronic information that may be relayed to server 200 or mobile computing devices 214. These various sources of electronic information may include various types of data, and may also include discrete particular information or may include databases of multiple sets of data. The particulars of each source of electronic information are discussed further below, FIG. 2 merely gives an overview of the system and its parts that are in communication with each other.

In no particular order, network 230 may be in communication with map data 218. Map data 218 may be any geographically descriptive data that indicates the location of roads, buildings, towns, cities, etc.

Next, network 230 may be in communication with government data 216. Government data 216 may be any of the wide range of electronic data published by a local, state, or national government—including road and traffic conditions.

Lodging and hotel information is shown in FIG. 2 as 212. Lodging information may include data descriptive of a place to sleep, including embodiments such as: hotels, motels, hostels, house sharing short term rentals such as AirBnB, homeless shelters, and emergency shelters, among others. Network 230 may receive lodging and hotel information 212 in ways such as directly from one or more corporate hotel operators Automobile gasoline information 210 may also be in communication with server 200 via network 230. Automobile gasoline information may include data descriptive of the location and availability of unleaded gas, or diesel at various gas stations or emergency sites.

Grocery store or retailer information 208 may communicate with server 200 in conjunction with network 230. Store information may broadly include data description of a location and available of food, water, over-the-counter medical supplies, pet food, pet medicine, emergency preparedness supplies such as blankets and batteries, or other products that may be commonly found at a grocery store.

Internet access information 206 may also be in communication with network 230 such that server 200 receives this type of information. Internet access information 206 may include data descriptive of the location and availability of wi-fi access, "hot spot" access, or other access to the internet. In some circumstances, consumers may commonly access the internet when away from home at a coffee shop, café, restaurant, library, and so internet access information 206 may include the location of various coffee shops and other places with WiFi.

Finally, medical information 204 may also be received by server 200. Medical information 204 may include information about the location and availability of hospitals, urgent care centers, primary care offices, pharmacies, or other medical providers.

In total, FIG. 2 shows how multiple sources of information may be communicated between various parts of a system for preparing route guidance information. Server 200 is in two-way communication with network 230, as are the mobile computing devices 214. Together, these pieces of hardware receive data from network 230 in order to incorporate them into a calculation to produce route guidance information. In the particular embodiment shown in FIG. 2, server 200 is distinct from mobile computing devices 214—and therefore server 200 is in communication with one or more mobile computing devices 214. In this embodiment, server 200 may receive information (204, 206, 208, 210, 212, 216, 218) via network 230 and then server 200 may perform one or more calculation steps to produce the route guidance information. Server 200 then may send the route guidance information to mobile computing devices 214.

However, in other embodiments not shown, mobile computing devices 214 may act as a type of server itself, by receiving information (204, 206, 208, 210, 212, 216, 218) via network 230 without a separate server 200 as an intermediary. In these embodiments, mobile computing devices 214 may receive the data, perform the calculations, and generate and display the route guidance information. In either embodiment, the underlying steps taken by the hardware making up the navigation system are shown in FIG. 3.

Figure 3:
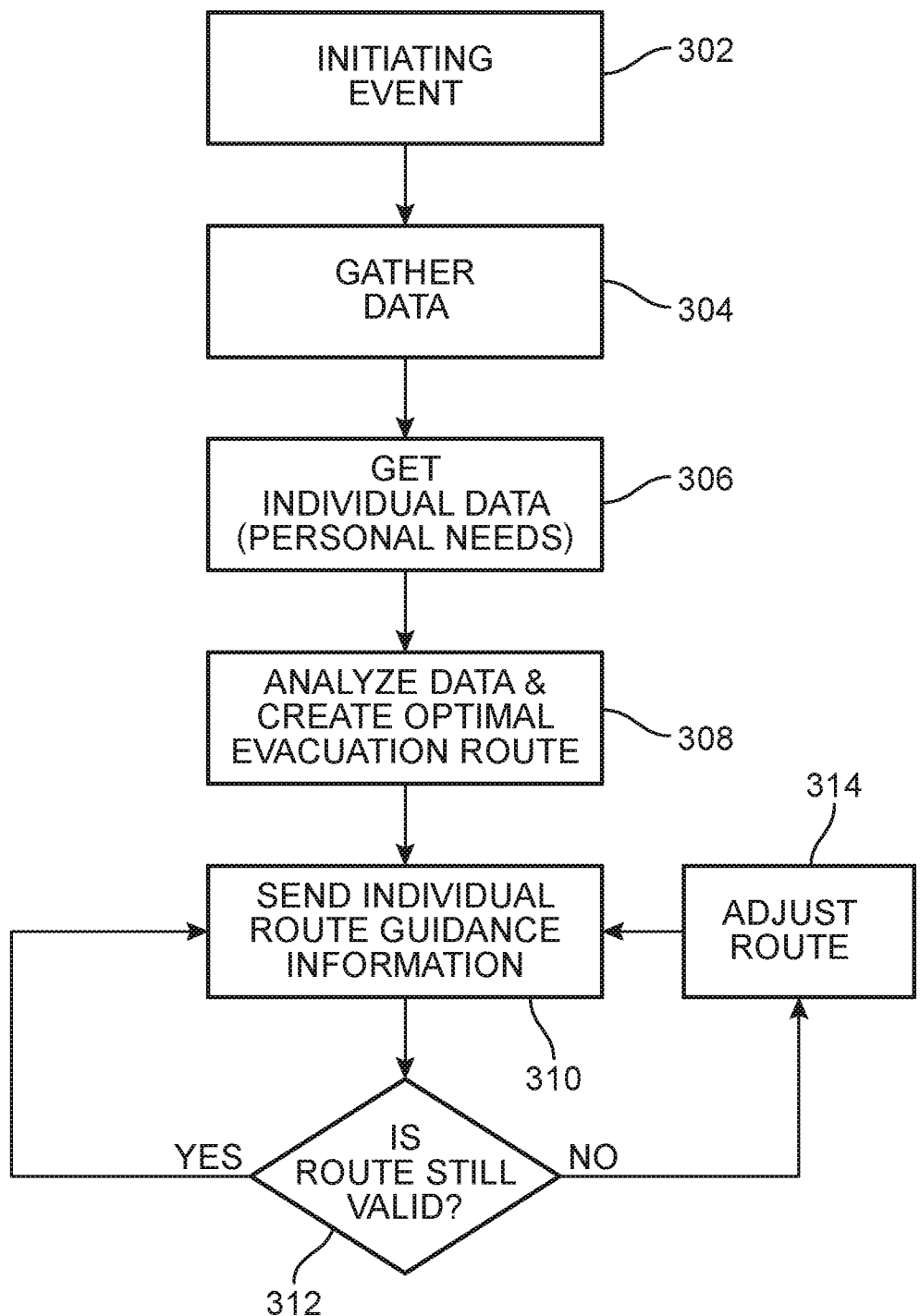
FIG. 3 is a flowchart showing various steps included in a method performed in accordance with this disclosure.

In particular, FIG. 3 shows a flowchart diagram of a method of operating a navigation system. FIG. 3 is an overview of the steps, and further detail regarding each step are discussed below with respect to FIGS. 4-9. While the method of FIG. 3 is shown and discussed with a certain order to the steps, in other embodiments any of the several the steps may be conducted in a variety of other orders or in parallel at the same time.

Initiating event step 302 as shown in FIG. 3 may be the beginning step in an embodiment of a method of operating a navigation system. Initiating event 302 may trigger a navigation system to begin preparing route guidance information, upon receipt of some stimuli data. Initiative event 302 is shown in greater detail in FIG. 4.

Step 304 in the method of FIG. 3 involves gathering data from one or more data sources. In particular, the navigation system may receive data from at least one database. Generally, a database may include any kind of storage device, including but not limited to: magnetic, optical, magneto-optical, and/or memory, including volatile memory and non-volatile memory. In some embodiments, a database may be integral with server 200 or mobile computing device 214. In these embodiments, the step of "receiving" or "getting" data may involve reading the information from a non-transitory computer storage medium. In other embodiments, a database may be separate from either server 200 or mobile computing device 214, and so the navigation system may receive data via the network 230. Data gathering step 204 is shown in greater detail in FIG. 5.

Next, step 306 in the method shown in FIG. 3 involved getting individual data regarding personal needs. Generally, the individual data regarding personal needs in step 306 relates to one or more personal consumption needs such as food, water, shelter, gas, etc. The method of FIG. 3 may get this data from a user via a user's mobile computing device 214. Step 306 is shown in greater detail in FIG. 6.

The method then will analyze the multiple types of data and create the route guidance information in step 308. In one embodiment, step 308 creates an optimal evacuation route 118 away from a danger region 108 toward a safety region 109 that both minimizes traffic and enables the user to fulfil their personal consumption needs. Step 308 is shown in greater detail in FIG. 7.

In step 310, the route guidance information created in step 308 is sent to the user. In one embodiment, the route guidance information may be calculated on server 200, and then transmitted via network 230 to mobile computing device 214 where a user can interact with it. However, in other embodiments where step 308 is performed by a mobile computing device itself, the step 310 of "sending" the route guidance information may involve displaying the route guidance information on the mobile computing device. In this way, step 310 of sending the individualized route guidance information may involve transmitting data over long distances, short distances, over a wireless network, over a wired network, across multiple pieces of hardware, or within a single piece of computing hardware. Generally, the personalized route guidance information need only be accessible to the user in a meaningful way. Accordingly, the user may drive their vehicle (or engage in whichever other mode of transportation they prefer as may be appropriate to the circumstances, such as bicycling, running, etc.) along a route as presented in the route guidance information.

In some embodiments, the method in accordance with this disclosure may complete upon sending the route guidance information in step 310. However, FIG. 3 shows additional steps that may provide additional advantages in some embodiments. In step 312, the method performs an iterative step of checking whether the route guidance information is still valid. Generally, validation step 312 may occur by repeating steps 304 and 308 to gather additional data and then analyze the new data to determine if a new set of route guidance information would result. Validation step 312 may be done continuously, on demand, or may be done at select periodic time intervals. In some embodiments, validation step 312 may also involve repeating step 306 by receiving additional individual data regarding personal consumption needs.

If route validation step 312 determines that the newly received data does not differ in such a way from the originally received data as to cause the need for new route guidance information, no further step may be taken. However, if route validation step 312 determines that a new set of route guidance information may be necessary then route adjustment step 314 occurs. Route adjustment step 314 may involve calculating and preparing a new set of route guidance information that differs on one or more ways from the route guidance information originally calculated in step 308. The new set of route guidance information is then sent to the user in a repetition of step 310.

In particular embodiments, steps 312 and 314 may involve determining whether the route guidance information prepared at a first time is still valid at a second later time, by comparing data received at the first time with data received at the second time. The interval between the first time and the second time may be as short as fractions of a second to longer intervals such as hours—the interval duration may be based on factors such as the nature of the data being compared, the ability to communicate with one or more databases, and whether network 230 is able to handle additional data loads. In this way, steps 312 and 314 may take place at an appropriate periodic time interval, or on demand (real-time user initiation).

By performing iterative steps 312 and 314, the navigation system ensures that the best possible route guidance information is presented to the user despite any changes in resource availability, traffic, or other conditions. This ensures that the user's personal consumption needs can continue to be met by the route presented by the navigation system. In some embodiments, for example, real-time changes in resource availability data may be received in step 304 and step 312. The route guidance information may therefore update in real-time to ensure that a user's personal consumption needs can be met along the route described by the route guidance information.

Figure 4:
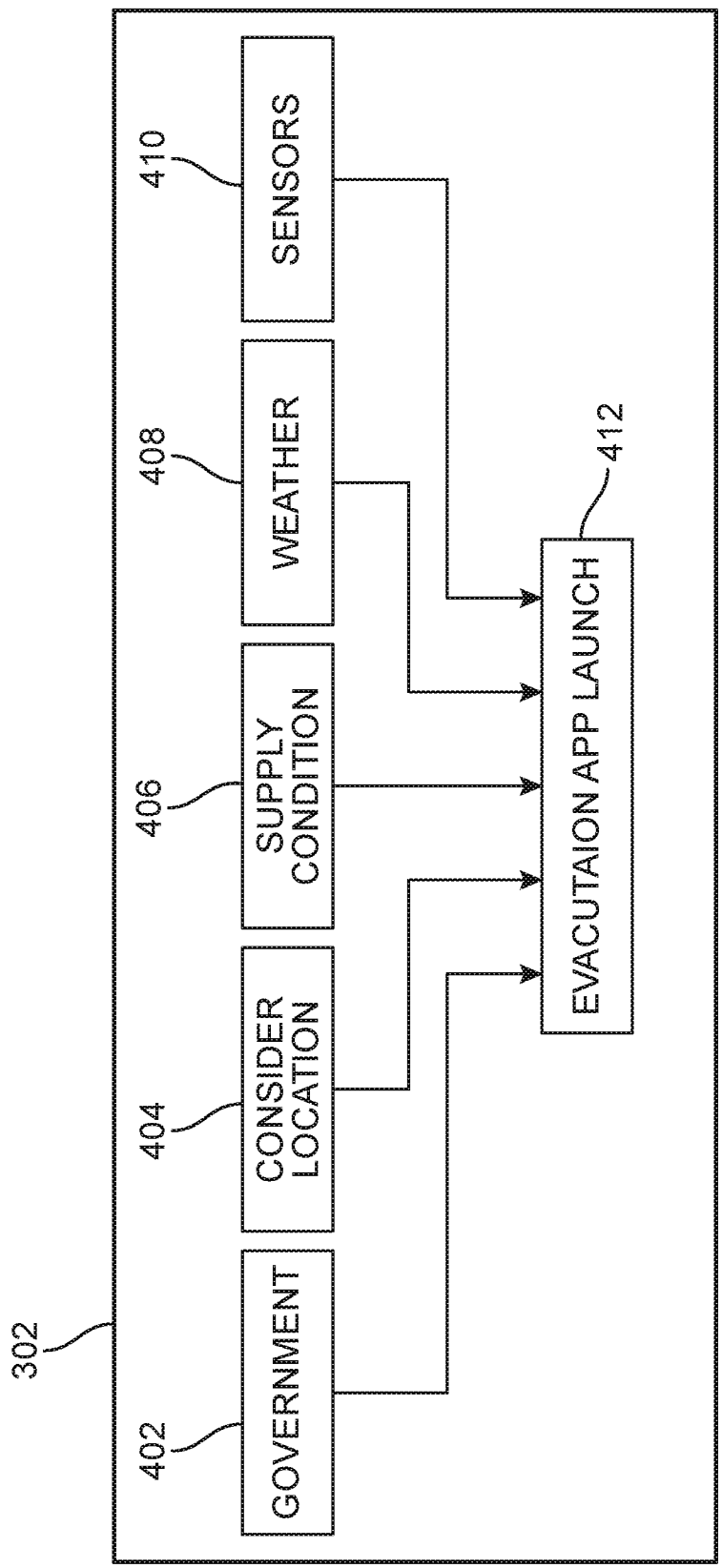
FIG. 4 is a diagram showing additional embodiments with respect to first step 302 in the method shown in FIG. 3 regarding the initiating event.

FIG. 4 shows greater detail about initiating event step 302 from FIG. 3. In particular, FIG. 4 shows how any of a variety of data sources (402, 406, 408, 410) may trigger the method of FIG. 3 to commence by launching a piece of computer software 412.

For example, a government data source 402 may include a government evacuation warning such as an alert provided by the website www.Ready.gov. An initiating event step 302 may also be triggered by a supply condition 406, such as an alert from a local grocery chain that supplies of basic necessities are low, or an alert from a gas station chain that local supplies of gasoline are close to being exhausted. In other embodiments, the initiating event step 3 may be triggered by a weather data source 408 like a hurricane alert from the National Oceanic and Atmospheric Administration. Finally, in yet another embodiment, initiating event step 302 may be triggered by sensor data 410 such as from sensors that measure rainfall, sensors that measure flooding conditions, sensors that monitor a local dam, or other types of sensors.

Initiating event step 302 also includes a step 404 of considering the location involved in the data received (402, 406, 408, 410) in relation to one or more users of a piece of computing software 412. Namely, a hurricane alert in Florida shouldn't trigger software in mobile devices in Texas.

Figure 5:
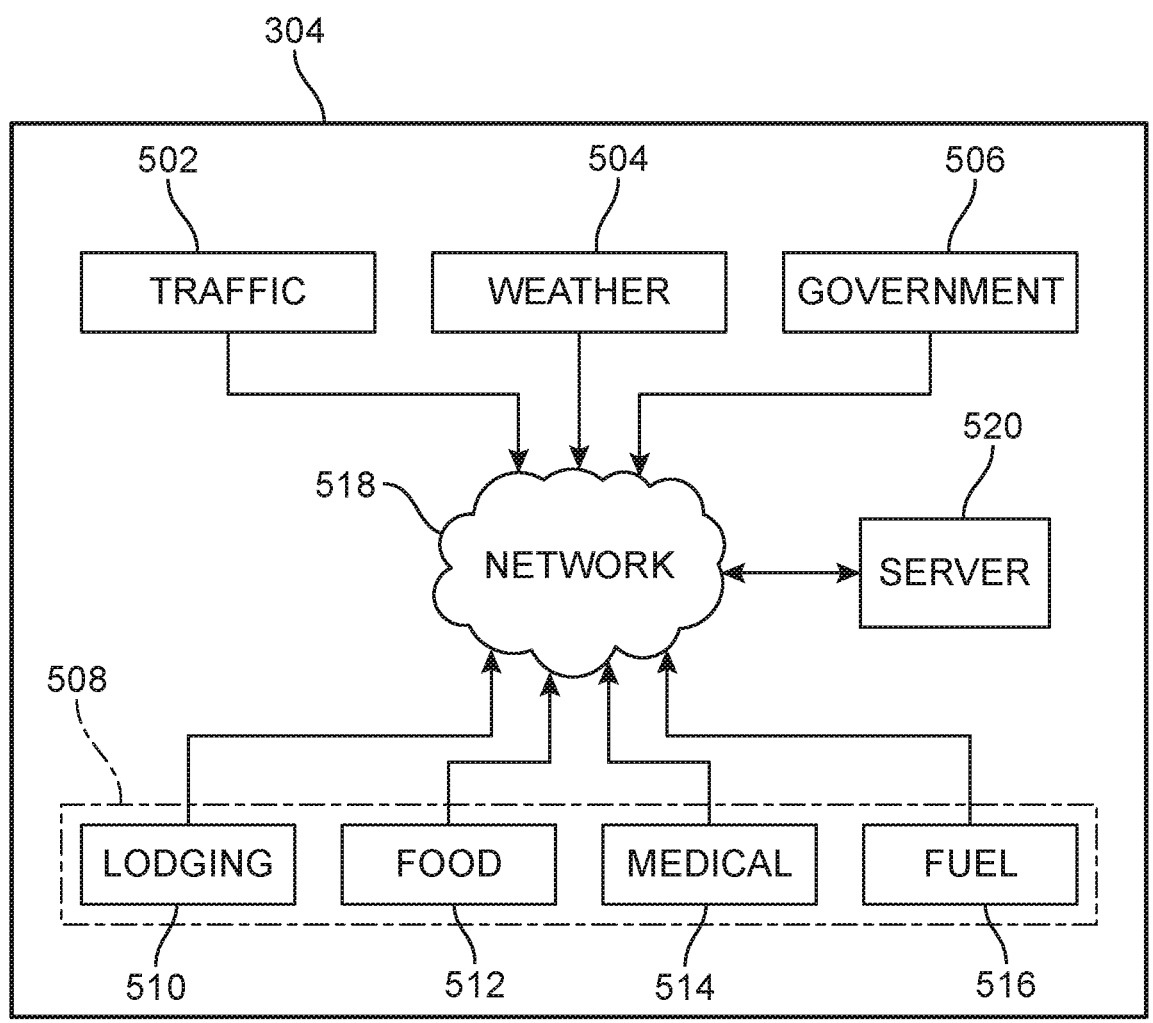
FIG. 5 is a diagram showing additional embodiments with respect to a second step 304 in the method shown in FIG. 3 regarding receiving data from one or more databases.

FIG. 5 shows data gathering step 304 from FIG. 3 in greater detail. Generally, step 304 involves gathering the data that will later be used to calculate the optimal route guidance information. This is in contrast to the data involved in the initiating event step 302 discussed above, which merely launches the process.

A variety of types of data may be incorporated into step 304, as shown in FIG. 5. First, traffic data 502 may be received from any of a variety of known traffic databases. Examples of traffic databases include databases created and licensed by TomTom, Automotive Navigation Data, Hexagon AB, Intermap Technologies, OpenStreetMap, Waze, Tele Atlas, and AutoNavi.

Next, weather data 504 may be received as a part of data gathering step 304. Weather data 504 may be received from a variety of organizations such as the National Oceanic and Atmospheric Administration, AccuWeather, WeatherBug, Weather Underground, or OpenWeatherMap.

Certain types of government data 506 may be received and used to calculate the route guidance information. Government data 506 may include information such as the type of natural disaster, the geographic location of a disaster, road condition data, and others. In particular, government data 506 may include information descriptive of a danger region 108 from which an evacuation maybe necessary, and a safety region 109 outside of an evacuation zone, as shown in FIG. 1. The source of this government data 506 may be a government run website and data source like www.Ready.gov.

Step 304 also includes gathering data about one or more consumable resources 508. Generally, consumable resource data 508 should include at least the location and availability of a particular type of consumable resource. A consumable resource may generally be any product or service used by a person, which can be depleted or has a maximum capacity. Beyond location and availability, in other embodiments, consumable resource data 508 may include further data descriptive of other qualities of a consumable resource— such as quality, flavor, packaging type, etc. Broadly, consumable resource data 508 may be descriptive of the supply of a product or service and may also be referred to as supply information.

Lodging consumable resource data 510 may generally be any data descriptive of the location and availability of hotels, motels, emergency shelters, or other places where lodging may be available. As discussed above with respect to lodging 212 in FIG. 2, lodging consumable resource data 510 be received from a variety of sources such as: a hotel aggregation provider like Hotels.com, the Expedia Affiliate Network API, the TripAdvisor Content API, Ailyo RESTful API, AirBnB, and others.

Food consumable resource data 512 may generally be any data descriptive of the location and availability of food fit for human consumption. This may include grocery stores, restaurants, emergency food provision stations, farm stands, and many other food sources. Food consumable resource data may be received from food specific sources like the Yelp API, the Zomato API, OpenTable.com, OpenMenu.org, the Locu API, and food related information provided by major internet data aggregators like Google or Yahoo, among others.

Medical consumable resource data 514 may generally be any data descriptive of the location and availability of a medical service, medical device, prescription pharmaceutical, over the counter drug, first aid supplies, or other product or service involving medicine in some manner. Medical consumable resource data 514 may be received from sources such databases maintained by pharmacies, databases maintained by hospital systems such as Kaiser Permanente, the Doximity API, and medical related information provided by major internet data aggregators like Google or Apple.

Fuel consumable resource data 516 may generally be any data descriptive of the location and availability of automobile gasoline, diesel, electricity, or even boat fuel, or other types of fuel that propel an internal combustion engine or electric engine in a vehicle used a mode of transportation. Fuel consumable resource data 516 may be received from sources such as GasBuddy, mygasfeed.com, the All Stations API, OSMFuel with OpenStreetMap, and major internet data aggregators like Google.

The examples of consumable resource data 508 included in FIG. 5 are lodging data 510, food data 512, medical data 514, and fuel data 516. Nonetheless, a variety of other specific types of consumable resource data may also be included in step 304. For example, other types of consumable resource data may include data descriptive of pet food, pet medicine, toileting needs, internet access, general purpose stores, and others.

The discussion above provides several examples of various consumable resource data 508 providers from which a navigation system in accordance with this disclosure may receive consumable resource data 508. However, a person having ordinary skill in the art may be knowledgeable of other websites, application programming interfaces, databases, and other data sources that may serve the same role in this disclosure.

In some embodiments, data gathering step 304 includes receiving data regarding more than one type of consumable resource 508. For example, two or more of 510, 512, 514, and 516. As indicated in FIG. 5, each of 510, 512, 514, and 516 may originate from a different database source. However, in other embodiments the consumable resource information 508 may originate from a single database source that itself includes data descriptive of two or more types of consumable resources.

FIG. 5 further shows how sources of data 502, 504, 506, 508 are in communication with network 518. Network 518 may be any network capable of transmitting data over a wired or wireless infrastructure, as discussed above with respect to network 230 shown in FIG. 2. Network 518 is then in communication with server 520. Server 520 may the same as discussed above with respect to server 200 shown in FIG. 2. As result of this system architecture, the various types of data 502, 504, 506, 508 are transmitted to server 520 which may then perform the calculations to prepare an optimal set of route guidance information.

Figure 6:
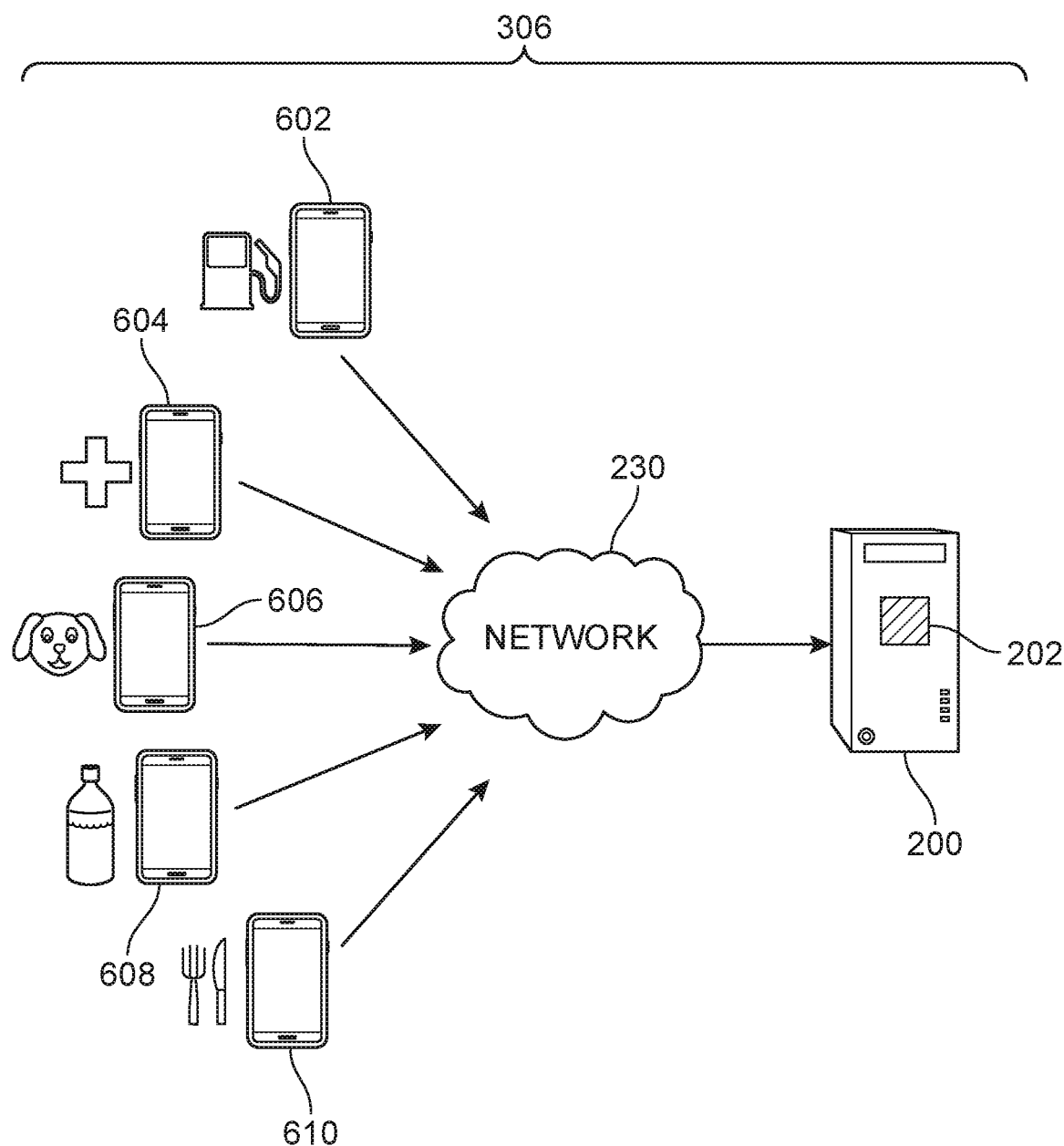
FIG. 6 is a diagram showing additional embodiments with respect to a third step 306 in the method shown in FIG. 3 regarding receiving individual data on personal needs.

FIG. 6 shows step 306 of FIG. 3 in greater detail. Step 306 includes receiving individualized data that is descriptive of one or more personal consumption needs of a user. In the embodiment shown in FIG. 6, a mobile computing device such as a smartphone may be configured to accept a user input that describes one or more personal consumption needs. For example, a user may open an app on their smartphone and enter inputs using the smartphone's touch screen.

Some of the various personal consumption needs of a user that may be entered are shown in FIG. 6. For example, a user may enter personal consumption needs related to automobile gasoline 602, medical needs 604, pet needs 606, water 608, or food 610. The mobile computing device may be configured to prompt the user regarding each of several types of personal consumption needs, and the user may input a need or lack of need. In various embodiments, the user inputs may be binary ("do you need water—yes/no?") or the user inputs may be a scalar quantity ("how much water do you need?"/ "how much water do you have?"). The mobile computing device may also be configured to allow the user to rank multiple personal consumption needs, so as to place a higher priority on certain needs over others.

Each of mobile computing device 214 accepts user input of the personal consumption needs 602, 604, 606, 608, 610 and is in communication with network 230. FIG. 6 again shows how network 230 is then in communication with server 200, as discussed above with respect to FIG. 2. In this embodiment, server 200 receives data from various database sources in step 304 as shown in FIG. 5, and then receives personalized consumption need data in step 306 as shown in FIG. 6.

Figure 7:
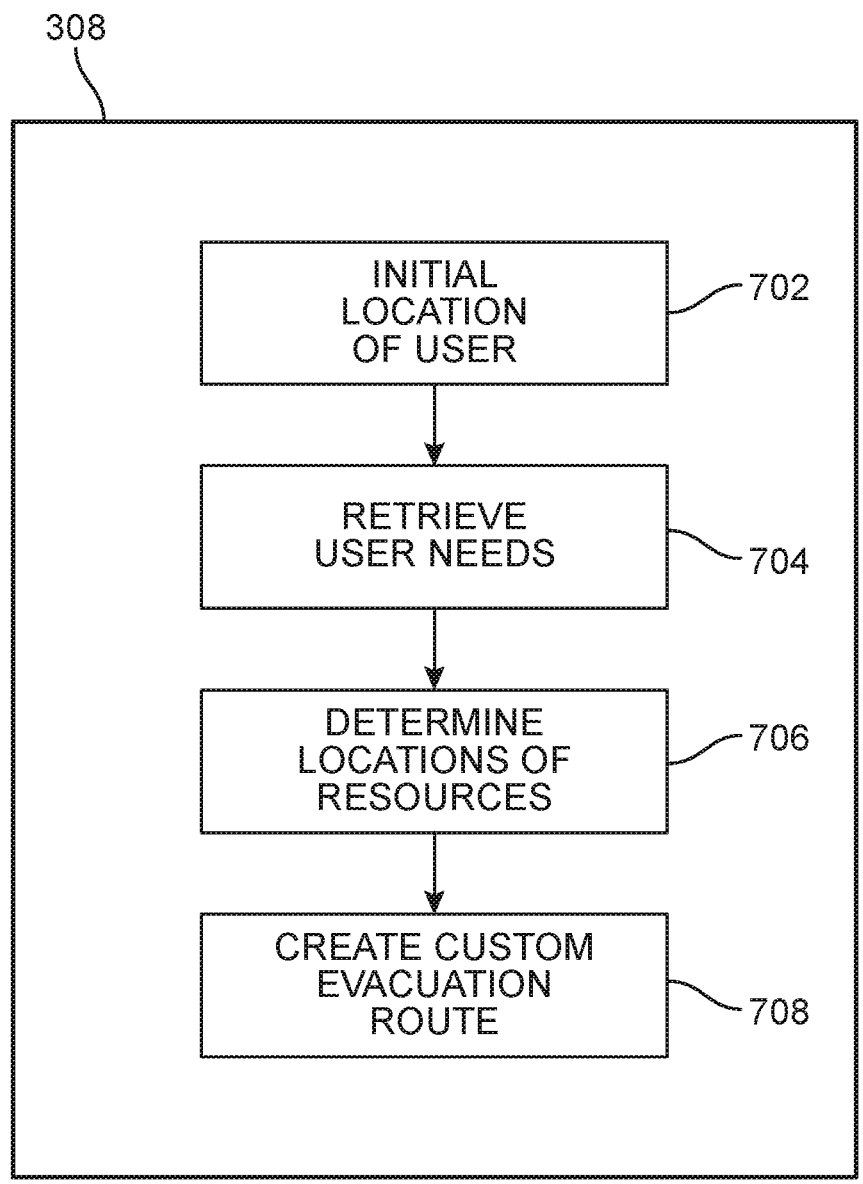
FIG. 7 is a flowchart showing additional embodiments with respect to a fourth step 308 in the method shown in FIG. 3 regarding calculating an optimal set of route guidance information.

FIG. 7 next shows what sever 200 does with the several types of data that sever 200 has received—which is step 308 as per FIG. 3. Namely, server 200 analyzes the data and creates the optimal route guidance information. In order to do so, sever 200 first also received an initial location of a user 702. The initial location of a user 702 may be automatically generated by a mobile computing device 214 based on the present physical location of the mobile computing device 214. However, in other embodiments, the initial location of a user 702 may be inputted by a user. The initial location of a user may be used by server 200 as the geographic starting point in the route guidance information.

Sever 200 next retrieves the user personal consumption needs 704 that it received in step 306. The personal consumption needs 704 are then compared against the information related to the location and availability of a consumable resource, as was received in step 304, to determine the nearby location of the needed resource 706 in the vicinity of the initial location 702. Finally, using the nearby location of the needed resource 706, sever 200 calculates an optimal set of route guidance information 708. Step 708 may include calculations that are further based on other data beyond 706—such as traffic data 502, weather data 504, government data 506, etc.

In this way, server 200 creates a custom set of route guidance information that not only gives point-to-point directions but also provides the user with a route that enables the user to fulfil one or more personal consumption needs.

The calculations used to create and evaluate different sets of route guidance information may therefore optimize as much as possible across each of several variables, such as: travel time in view of traffic, ability to fulfil all personal consumption needs, ability to fulfil higher priority needs even if lower priority needs cannot also be fulfilled along a certain route, a need to travel beyond an evacuation zone to a safety region, and others.

Figure 10:
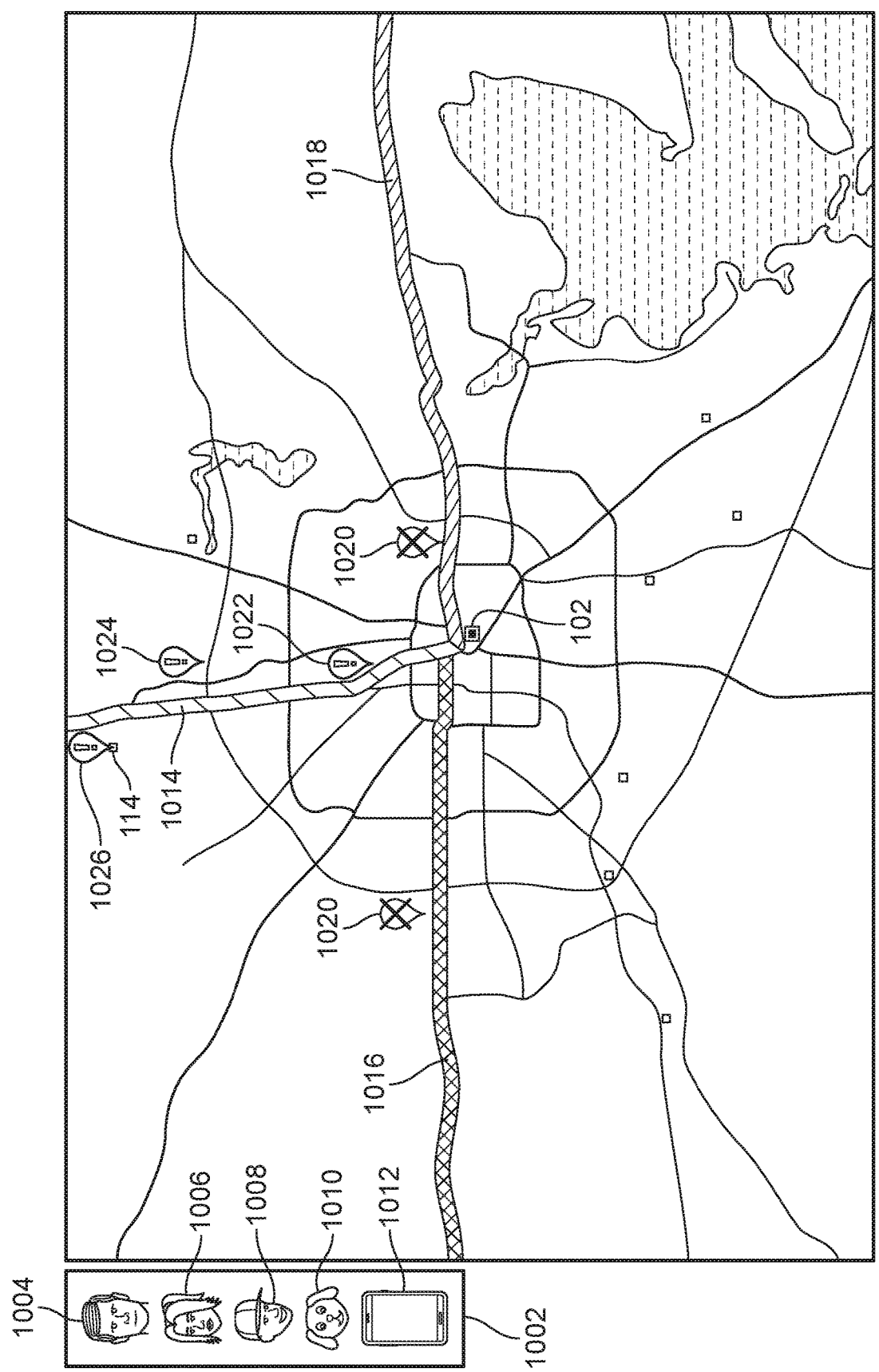
FIG. 10 is a map showing a graphical representation of a set of route guidance information, created in accordance with this disclosure, that displays consumable resources in relation to the calculated route.
Figure 11:
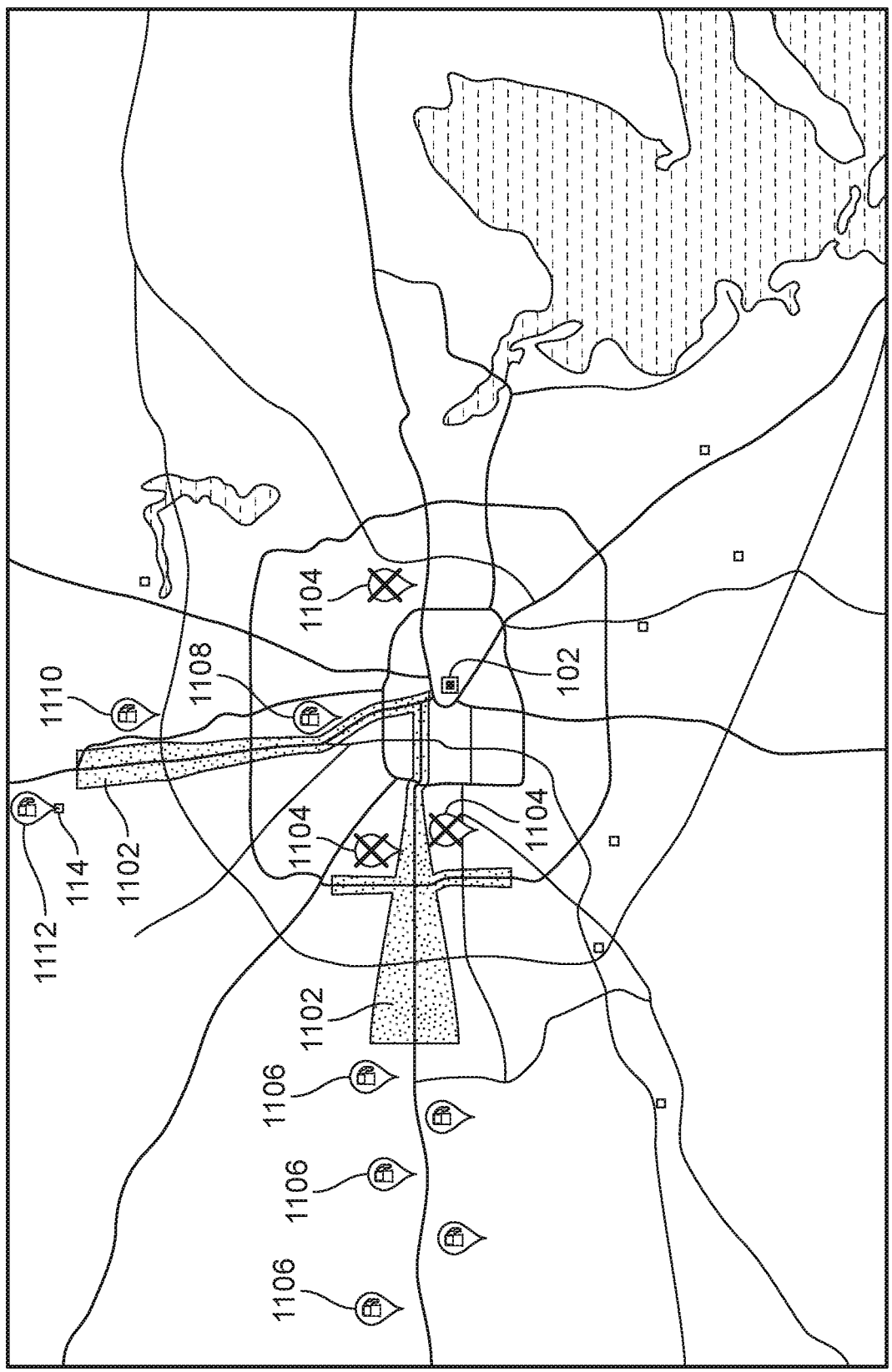
FIG. 11 is a map showing traffic information and the relation between the traffic information and the location and availability of a consumable resource.

FIG. 1 shows how three potential routes 116, 188, 120 may be evaluated in this way. Namely, step 708 of FIG. 7 within step 308 may determine that route 116 is not optimal because it is congested with traffic, and route 120 is not optimal because it does not travel outside the evacuation zone 108 within a sufficient distance. In contrast, route 118 may achieve all of the following considerations: avoiding traffic, travelling to outside a danger region 108, and provide opportunity to fulfil personal consumption needs at outlying town 114. Further details in this regard are shown in FIGS. 10 and 11.

Figure 8:
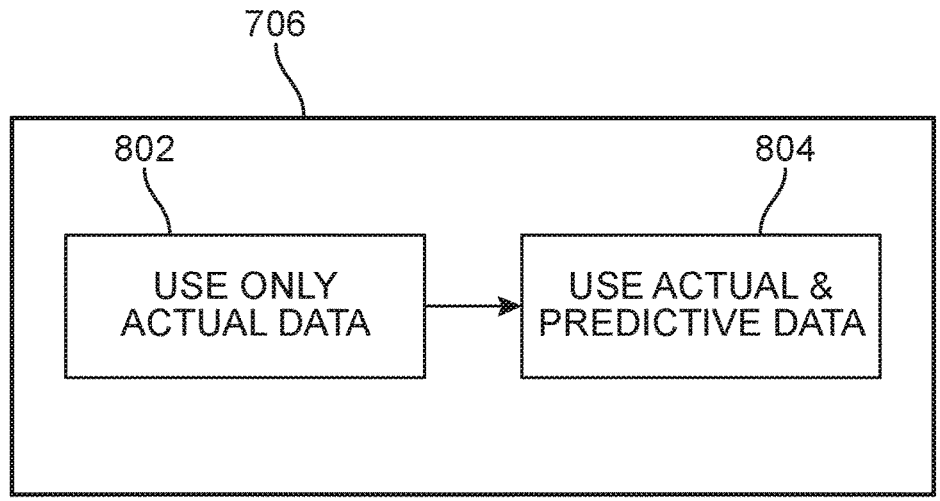
FIG. 8 is a diagram showing two embodiments of how to determine locations of consumable resources.
Figure 9:
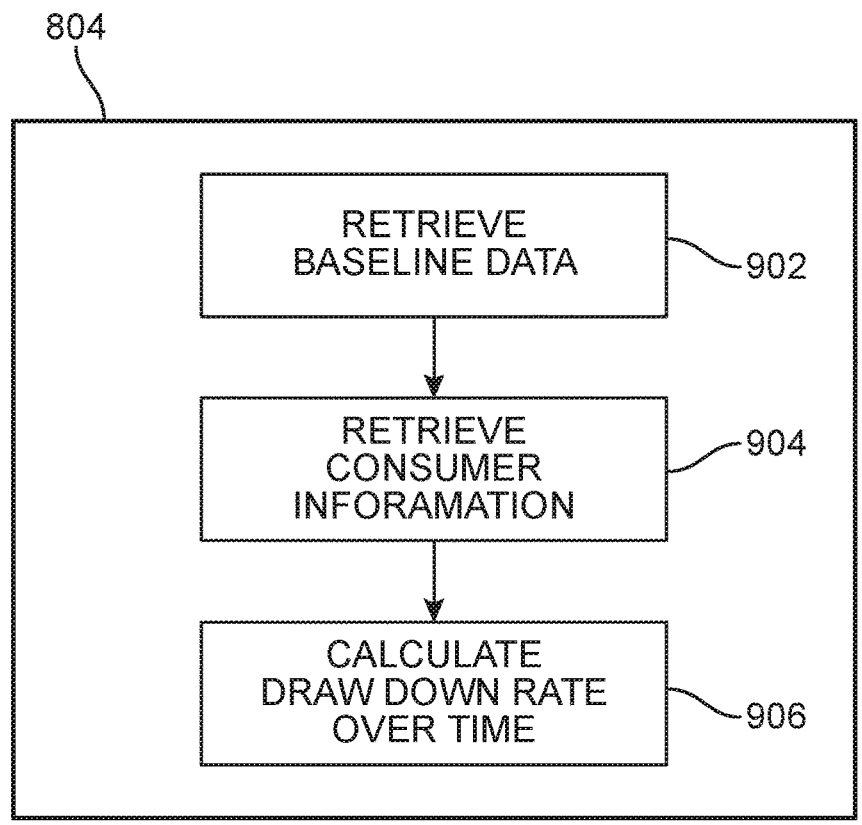
FIG. 9 is a flowchart showing additional embodiments of a method for calculating a consumable resource draw-down rate over time.

But first, in some embodiments, the above discussed steps shown in FIG. 7 within step 308 may include additional features as shown in FIGS. 8 and 9.

Namely, FIG. 8 shows a brief diagram of how step 706 of determining the nearby location of the needed consumable resource 706 may include two options 802 and 804. In option 802 step 706 uses only actual data of the location and availability of a consumable resource as received from database 508 in step 304. This data 508 may be the most up-to-date actual data available for any given type of consumable resource. But this data would, at best, be real-time data describing the present actual location and present location of the consumable resource.

However, in option 804 step 706 may include not only the actual data 508 regarding a consumable resource but also engage in predictive forecasting to determine the location and availability of a consumable resource at a future time. This set of predictive data and actual data 804 may be used to better determine an optimal set of route guidance information by determining whether a consumable resource will still be available at the time a traveler reaches the location at which the consumable resource is located. For example, the navigation system may receive fuel data 516 describing the location and current availability of gas at various gas stations in step 304. However, in emergency situations such as an evacuation, a user may not necessarily want to take for granted that the gas will still be available by the time they travel to its location.

Therefore, the set of actual and predictive data 804 may be determined in accordance with the flowchart shown in FIG. 9. Namely, in step 902 the navigation system retrieves baseline data, the actual data descriptive of a consumable resource 508. Then, the navigation system may retrieve information on other consumers of the consumable resource in step 904. For example, the navigation system may retrieve traffic information to determine whether other consumers in the flow of traffic will use up the consumable resource. Namely, the navigation system may use the baseline data 902 and information about other consumers 904 to calculate a draw-down rate over time 906 at which the consumable resource is depleted or used to its capacity. Using this draw-down rate, the navigation system may then predict the availability of consumable resource at a future time. As a result, the navigation system would present route information that would meet the user's need for the consumable resource, even if the consumable resource is being depleted by other consumers—and would not steer a user towards e.g. a gas station that presently has gas but soon would no longer have gas.

As mentioned, the predictive process shown in FIG. 8 and FIG. 9 are embodiments of step 308 as shown in FIG. 3. Accordingly, the iterative steps 312 and 314 shown in FIG. 3 may also include the predictive process shown in FIGS. 8 and 9 because step 312 involves repeating essentially the same step as 308 at periodic time internals. Therefore, a navigation system in accordance with this disclosure not only is capable of preparing route guidance information that accurately guides a user toward available needed consumable resources that will be available where and when needed—but furthermore also ensures that the route guidance information is dynamically updated based on predictive data of what consumable resources will be available by the time a traveler reaches the location of a consumable resource.

In this way, the navigation system may ensure fulfillment of user needs in real-time response to changing conditions. In an emergency situation, conditions such as traffic and weather may be changing rapidly, and accurate and optimal route guidance information can sometimes mean the difference between a safe evacuation and a major secondary disaster.

FIG. 10 shows a graphical representation of route guidance information prepared in accordance with this disclosure. FIG. 10 is similar in many respects to FIG. 1, as both include a map of the same metro region 100. FIG. 10 shows user 1004, user 1006, user 1008, pet 1010, and mobile computing device 1012. The graphical data shown in FIG. 10 may be displayed on user 1004's mobile computing device 1012 in order to present route guidance information in a manner that best allows user 1004 to travel in accordance with the route guidance information. While user 1004 may operate and own mobile computing device 1012, generally "a user" as used in this disclosure may refer to one individual, or a group of more than one individual collectively. In this way, for example, user 1004 may input personal consumption needs that related not only to him but also to user 1006 and user 1008.

FIG. 10 also shows multiple route options in relation to the location and availability of a consumable resource. Namely, route 116 shows that a resource 1020 is not available. As previously mentioned with respect to FIG. 1, the navigation system may present route 1016 (route 116) as a rejected, or less-than-optimal, route due to traffic congestion. FIG. 10 then shows that 1016 is also rejected because it does not include a consumable resource 1020 needed by user 1004. Similarly, route 1018 also shows that consumable resource 1020 is not available along this route.

In contrast, FIG. 10 shows that route 1014 does include availability of resource 1022, resource 1024, and resource 1026. The navigation system may therefore graphically display that route 1014 is optimal, and graphically show (or audibly describe) the location and availability of the several resources along 1014. For example, resources 1022, 1024, 1026 may be gas stations with sufficient gas and water. In some embodiments, resources 1022, 1024, and 1026 may be same type of consumable resource. In other embodiments, these three may be different types of resources from each other—for example, resource 1022 may be a gas station, resource 1024 may be a grocery store, and resource 1026 may be a hotel in town 114. The user 1004 may therefore see that route 1014 meets his variety of personal consumption needs, and take this route to evacuate from starting location 102.

FIG. 11 shows another graphical representation of route guidance information. This figure shows how a navigation may calculate and present a draw-down rate to predict availability of a consumable resource at a future time. Namely, a volume of traffic flow is shown graphically as the width of 1102. As a mass of people evacuate from city center 102, this wave of traffic flow will consume resources. Certain resources 1104 have already been consumed. Therefore, the navigation system would receive data describing the lack of available of resources at locations 1104 at the present time. However, certain locations 1106 still have consumable resources available at the present time.

Without calculating predictive data, a navigation system may present route navigation information that steers a user towards resource locations 1106. However, in some embodiments, a navigation system in accordance with this disclosure would calculate a draw-down rate as described with regards to FIGS. 8 and 9 by receiving traffic information 502 and shown by traffic flows 1102. As a result, the navigation system would predict that the availability of the consumable resource at locations 1106 would soon be exhausted. In contrast, the availability of the consumable resource at locations 1108, 1110, and 1112 would not be exhausted. Therefore, the navigation system would use this predictive data in calculating the optimal route guidance information.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A system for preparing and sending route guidance information comprising:
   a server computer including a processor;
   the server computer being in communication with at least one consumption database; and
   the server also being in communication with at least one mobile computing device;
   wherein the server computer is configured to perform the steps of:
      receiving traffic information from a traffic database;
      receiving location information from the mobile computing device;
      receiving personal consumption needs information from the mobile computing device, the personal consumption needs information being inputted into the mobile computing device by a user;
      retrieving information from the at least one consumption database, wherein the at least one consumption database includes information related to a location and availability of a consumable resource;
      calculating fulfilment information, the fulfilment information being information regarding whether and where a personal consumption need of the user matches the location and availability of the consumable resource, by comparing the information related to the consumable resource from the consumption database with the location information and the personal consumption needs information received from the mobile computing device;
      preparing route guidance information, from a first geographic location specified in the location information received from the mobile computing device to a second geographic location, the route guidance information being calculated based on both the traffic information and the fulfilment information;
      wherein the second geographic location is automatically determined by the system so as to fulfil the personal consumption needs by matching the personal consumption needs with the fulfilment information;
      receiving a ranking of two or more consumption needs from the mobile computing device, the ranking having been inputted into the mobile computing device by the user, wherein the route guidance information is further prepared based on the ranking, such that the route guidance information prioritizes fulfilment of higher priority needs even if lower priority needs cannot also be fulfilled along a certain travel route described by the route guidance information; and
      sending the route guidance information and fulfilment information to the mobile computing device.

2. The system of claim 1, wherein the personal consumption needs information and the information related to the consumable resource are information related to one or more of: vehicle fuel; food, water, medicine, pet needs, toileting, lodging, and high-speed internet access.

3. The system of claim 1, wherein the server computer is configured to prepare the route guidance information by performing an optimization calculation that seeks to both:
   minimize travel time, based on the traffic information; and
   fulfil the personal consumption needs of the user, based on the fulfilment information.

4. The system of claim 1, wherein
   the personal consumption needs information includes information regarding two or more different types of personal consumption needs of the user, the two or more different types of personal consumption needs each having been entered into the mobile computing device by the user;
   the server computer is configured to retrieve information from one or more consumption databases, the one or more consumption databases collectively including information related to two or more different types of consumable resources;
   the server computer is configured to calculate the fulfilment information by comparing the two or more different types of personal consumption needs information with the two or more different types of consumable resources information; and
   the server computer is configured to prepare the route guidance information by performing an optimization calculation that seeks to fulfil the two or more different types of personal consumption needs, based on the fulfilment information.

5. The system of claim 1, wherein the server computer is further configured to:
   calculate fulfilment information based on location and availability of a consumable resource at a future time;
   wherein the location and availability of the consumable resource at the future time is calculated by comparing the received traffic information with received information related to a location and availability of the consumable resource at a first time, and then calculating a draw down rate over time to predict the availability of the consumable resource at a second and
   wherein the system automatically determines an alternative set of route guidance information when the fulfilment information based on location and availability of a consumable resource at a future time indicates that the consumable resource would no longer be available by the time the user travelled to the location of the consumable resource.

6. The system of claim 1, wherein the server computer is further configured to, at periodic time intervals:
receive additional traffic information from the traffic database;
retrieve additional information related to a new location and availability of the consumable resource;
calculate new fulfilment information based on the additional information related to the new location and availability of the consumable resource; and
prepare new route guidance information if the new fulfilment information is different from the fulfilment information, the new route guidance information being based on the new fulfilment information and the additional traffic information.

7. A method of operating a navigation system including a computer system in communication with at least one mobile computing device, the computer system being configured to perform the steps of:
receiving traffic information from a traffic database;
receiving location information from the mobile computing device;
receiving a set of two or more personal consumption needs information from the mobile computing device, the set of personal consumption needs information being entered into the mobile computing device by a user of the mobile computing device and being descriptive of the user's need for two or more types of consumable resources;
retrieving supply information from at least two separate consumption databases, the supply information being descriptive of a location and amount available of each of two or more types of consumable resources that correspond to each of the two or more types of personal consumption needs;
calculating present fulfilment information by comparing the set of personal consumption needs information to the supply information;
calculating future fulfilment information by comparing the present fulfilment information with the traffic information to determine a draw-down rate over time at which each of the two or more of types of consumable resources will be used up, so as to predict availability of each of the two or more consumable resources at a future time;
preparing route guidance information based on the traffic information, the present fulfilment information, and the future fulfilment information such that the route guidance information is automatically determined so as to allow the user to fulfil each of the two or more personal consumption needs by travelling to the location of each of the two or more consumable resources at the future time calculated in the future fulfillment information;
receiving a ranking of two or more consumption needs from the mobile computing device, the ranking having been inputted into the mobile computing device by the user, wherein the route guidance information is further prepared based on the ranking, such that the route guidance information prioritizes fulfilment of higher priority needs even if lower priority needs cannot also be fulfilled along a certain travel route described by the route guidance information; and
sending the route guidance information, and future fulfilment information, to the mobile computing device.

8. The method of claim 7, wherein the step of preparing the route guidance information includes performing an optimization calculation that seeks to both:
minimize travel time, based on the traffic information; and
fulfil the personal consumption needs of the user, based on the present fulfilment information and future fulfilment information.

9. The method of claim 7, wherein the at least two separate consumption databases each contain information that is selected from the group consisting of:
highway rest stops and toileting facilities; automobile gasoline stations; hotel lodging; hospitals and other medical facilities; commercial stores; public wi-fi and other high-speed internet access points; and pet related food and medical needs.

10. The method of claim 7, wherein the navigation system is further configured to perform the steps of:
determining whether the route guidance information prepared at a first time is still valid at a second later time; by comparing traffic information, location information, and supply information received at the first time with traffic information, location information, and supply information received at the second time; and
communicating a new set of route guidance information, present fulfilment information, or future fulfilment information if any change in the route guidance information, present fulfilment information, or future fulfilment information is calculated at the second time.

11. A mobile computing device configured to:
receive initiating event information, the initiating event information including geographic data regarding a danger region and a safety region;
generate location data based on a location of the mobile computing device;
receive traffic information from a traffic database;
receive inputs from a user of the mobile computing device relating to personal consumption needs information of the user;
retrieve information from at least one consumption database, wherein the at least one consumption database includes information related to a location and availability of a consumable resource;
calculate whether the mobile computing device is located within the danger region by comparing the initiating event information with the location data;
calculate fulfilment information, the fulfilment information being information regarding whether and where a personal consumption need of the user matches the location and availability of the consumable resource, by comparing the information related to the consumable resource from the consumption database with the location data and the personal consumption needs information;
prepare route guidance information, from a first geographic location within the danger region to a second geographic location within the safety region, the route guidance information being calculated based on both the traffic information and the fulfilment information;
wherein the second geographic location is automatically determined by the system so as to fulfil the personal consumption needs by matching the personal consumption needs with the fulfilment information and avoid the danger region by travelling into the safety region;
receive a ranking of two or more consumption needs from the mobile computing device, the ranking having been inputted into the mobile computing device by the user, wherein the route guidance information is further prepared based on the ranking, such that the route guidance information prioritizes fulfilment of higher priority needs even if lower priority needs cannot also be fulfilled along a certain travel route described by the route guidance information; and display the route guidance information and fulfilment information on the mobile computing device.

12. The mobile computing device of claim 11, wherein the first geographic location is the location of the mobile computing device; and the second geographic location is a location that is determined by the mobile computing device based on the traffic information and the fulfilment information.

13. The mobile computing device of claim 11, wherein the at least one consumption database contains information that is selected from the group consisting of:

highway rest stops and toileting facilities; vehicle fueling; hotel lodging; hospitals and other medical facilities; commercial stores; public wi-fi and other high-speed internet access points; and pet related food and medical needs.

14. The mobile computing device of claim 11, wherein the personal consumption needs information includes information regarding two or more different types of personal consumption needs of the user, the two or more different types of personal consumption needs each having been entered into the mobile computing device by the user;

the mobile computing device is configured to retrieve information from two or more separate consumption databases, each of the two or more separate consumption databases including information related to a different type of consumable resource;

the mobile computing device is configured to calculate the fulfilment information by comparing the two or more different types of personal consumption needs information with the two or more different types of consumable resources information received from the two or more separate consumption databases;

the mobile computing device is configured to prepare the route guidance information by performing an optimization calculation that seeks to fulfil the two or more different types of personal consumption needs, based on the fulfilment information;

and the fulfilment information further includes future fulfilment information, the future fulfilment information being calculated by comparing the fulfilment information with the traffic information to determine a drawdown rate over time at which each of the two or more consumable resources will be used up, so as to predict availability of each of the two or more consumable resources at a future time;

wherein the system automatically determines an alternative set of route guidance information when the fulfilment information based on location and availability of a consumable resource at a future time indicates that the consumable resource would no longer be available by the time the user travelled to the location of the consumable resource;

and wherein the mobile computing device is further configured to, at periodic time intervals:

receive additional traffic information from the traffic database;

retrieve additional information related to a new location and availability of the two or more consumable resources;

calculate new fulfilment information based on the additional information related to the new location and availability of the two or more consumable resources; and prepare new route guidance information if the new fulfilment information differs from the fulfilment information, the new route guidance information being based on the new fulfilment information and the additional traffic information.

15. The mobile computing device of claim 11, wherein the mobile computing device is further configured to:

receive the initiating event information, the initiating event information further including emergency information;

push a notification to the user, the notification including the emergency information, and the geographic data regarding a danger region and a safety region;

the notification further prompting the user to enter the inputs relating to personal consumption needs information.

* * * * *